United States Patent Office 2,835,704
Patented May 20, 1958

2,835,704

PANTETHEINE INTERMEDIATES

Edward Walton, Scotch Plains, N. J., assignor to Merck & Co., Inc., Rahway, N. J., a corporation of New Jersey No Drawing. Original application January 6, 1953, Serial No. 329,928. Divided and this application March 21, 1955, Serial No. 495,750

1 Claim. (Cl. 260—562)

This application is a division of co-pending application Serial No. 329,928, filed January 6, 1953, now abandoned.

This invention relates to the preparation of pantetheine, α,γ - dihydroxy - β,β - dimethylbutyryl - β - alanyl - β - aminoethanethiol. It is also concerned with the preparation of the novel compounds produced as intermediates in the synthesis of α,γ - dihydroxy - β,β - dimethylbutyryl - β - alanyl - β- aminoethanethiol.

It has been found that α,γ - dihydroxy - β,β - dimethylbutyryl - β - alanyl - β - aminoethanethiol possesses marked and effective biological activity which stimulates the growth of Lactobacillus bulgaricus and is related to co-enzyme A. It has also been found that α,γ - dihydroxy - β,β - dimethylbutyryl - β - alanyl - β - aminoethanethiol possesses pantothenic acid activity.

In accordance with this novel process for preparing α,γ - dihydroxy - β,β - dimethylbutyryl - β - alanyl - β - aminoethanethiol, one of the starting materials utilized is an N - substituted - β - alanyl halide which may be identified by the following formula—

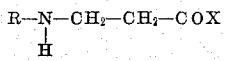

wherein R is a radical removable by reduction and X is a halogen. N - substituted - β - alanyl halides which are suitable for this reaction include compounds wherein the N - substituent is carbobenzoxy, nuclearly substituted carbobenzoxy, arylsulfonyl, carboalloxy or substituted carboalloxy.

The other starting material utilized is S - substituted - β - aminoethanethiol which has the formula—

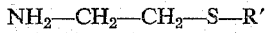

wherein R' is a radical removable by reduction.

The S - substituted - β - aminoethanethiol compounds which may be employed include compounds wherein the S - substituent is a suitable alkenyl or aralkyl radical having a double bond in the β,γ - position relative to the sulfur atom.

It has been found that these two compounds, N - substituted - β - alanyl halide and S - substituted - β - aminoethanethiol, can be caused to react to yield N - substituted - β - alanyl - S - substituted - β - aminoethanethiol having the following formula—

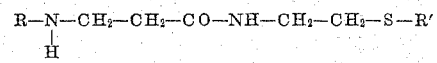

wherein R and R' are as described above.

The above product is reacted with an alkali or alkaline earth metal in liquid ammonia methylamine or mixtures thereof to form the alkali or alkaline earth metal salt of β - alanyl - β - aminoethanethiol, which may be identified by the following formula—

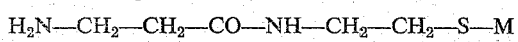

wherein M is an alkali or alkaline earth metal.

Upon treatment of the alkali or alkaline earth metal salt of β - alanyl - β - aminoethanethiol with an aqueous solution of a mineral acid, there is obtained β - alanyl - β - aminoethanethiol which may be identified by the following formula—

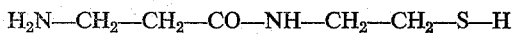

The alkali or alkaline earth metal salt of β - alanyl - β - aminoethanethiol is reacted with a suitable alkenyl or aralkyl halide to form a compound of the formula—

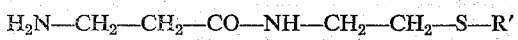

wherein R' is as above.

The β - alanyl - S - substituted - β - aminoethanethiol wherein the substitued radical is an alkenyl or aralkyl radical, is reacted with α - hydroxy - β,β - dimethyl - γ - butyrolactone to form α,γ - dihydroxy - β,β - dimethylbutyryl - β - alanyl - S - substituted - β - aminoethanethiol. Reduction of the latter compound yields α,γ - dihydroxy - β,β - dimethylbutyryl - β - alanyl - β - aminoethanethiol.

Regarded in certain of its broader aspects, the process according to the present invention, comprises reacting an N - substituted - β - alanyl halide, wherein the substituted radical is removable by reduction, with S - substituted - β - aminoethanethiol wherein the substituted radical is an alkenyl or aralkyl radical removable by reduction, to form the corresponding N - substituted - β - alanyl - S - substituted - β - aminoethanethiol, reacting the latter compound with an alkali or alkaline earth metal in liquid ammonia methylamine or mixtures thereof to form the alkali or alkaline earth metal salt of β - alanyl - β - aminoethanethiol, reacting said salt with a suitable alkenyl or aralkyl halide, having a double bond in the β,γ-position relative to the halogen atom, to form β-alanyl-S-substituted - β - aminoethanethiol, reacting the latter compound with α - hydroxy - β,β - dimethyl - γ - butyrolactone to form α,γ - dihydroxy - β,β - dimethylbutyryl - β - alanyl - S - substituted - β - aminoethanethiol and reducing the latter compound to form α,γ-dihydroxy-β,β - dimethylbutyryl - β - alanyl - β - aminomethanethiol.

Some of the N - substituted - β - alanyl halides which can be employed in this novel process are N - carbobenzoxy - β - alanyl halide, N - (p - nitrocarbobenzoxy) - β - alanyl halide, N - benzenesulfonyl - β - alanyl halide, N - p - toluenesulfonyl - β - alanyl halide and N - carboalloxy - β - alanyl halide. N - carbobenzoxy - β - alanyl halide is the preferred N - substituted - β - alanyl halide.

Some of the S - substituted - β - aminoethanethiols which can be employed in this process are S - benzyl - β - aminoethanethiol, S - allyl - β - aminoethanethiol, S - methyallyl - β - aminoethanethiol and S - crotyl - β - aminoethanethiol.

In accordance with this novel process, the N-substituted-β-alanyl halide is reacted with an approximately equimolar quantity of S-substituted-β-aminoethanethiol in the presence of an acid binding agent and an inert solvent.

The acid binding agent may be an organic or inorganic base capable of reacting with the acid formed during the reaction. Alkali or alkaline earth metal hydroxides, oxides or carbonates and organic bases such as tetraalkylammonium hydroxides or tertiary amines may be used for this purpose. Sufficient acid binding agent is employed to neutralize the acid formed during the reaction of N-substituted-β-alanyl halide with S-substituted-β-aminoethanethiol.

In carrying out the reaction of N-substituted-β-alanyl halide with S-substituted-β-aminoethanethiol, any solvent can be employed, provided the solvent does not react with the N-substituted-β-alanyl halide. Saturated hydrocarbons, aromatic hydrocarbons, halogenated hydrocarbons and ethers examples of which are respectively octanes, benzene, chloroform, ethyl ether and dibutyl ether, are suitable solvents for this reaction. Ethyl ether is preferred as the solvent in the reaction of N-carbobenzoxy-β-alanyl chloride with S-benzyl-β-aminoethanethiol.

Although the reaction temperature is not critical, the reaction of N-substituted-β-alanyl halide with S-substituted-β-aminoethanethiol is exothermic and it is preferable to maintain the reaction mixture at temperatures below 20° C. by cooling. The reaction proceeds rapidly at temperatures below 20° C., so that prolonged stirring is unnecessary.

In accordance with the above procedure some of the N - substituted-β-alanyl-S-substituted-β-aminoethanethiols produced are N-carbobenzoxy-β-alanyl-S-benzyl-β-aminoethanethiol, N-carbobenzoxy - β - alanyl-S-allyl-β-aminoethanethiol, N-carbobenzoxy - β - alanyl-S-methallyl-β-aminoethanethiol, N - carbobenzoxy-β-alanyl-S-crotyl-β-aminoethanthiol, N-(p - nitrocarbobenzoxy)-β-alanyl-S-benzyl-β-aminoethanethiol, N-(p-nitrocarbobenzoxy)-β-alanyl-S-allyl-β-aminoethanethiol, N-(p-nitrocarbobenzoxy)-β-alanyl-S-methallyl-β-aminoethanethiol, N-(p-nitrocarbobenzoxy)-β-alanyl-S-crotyl-β-aminoethanethiol, N-p-toluenesulfonyl-β-alanyl-S-benzyl-β-aminoethanethiol, N-p-toluenesulfonyl-β-alanyl-S-allyl-β-aminoethanethiol, N-p-toluenesulfonyl-β-alanyl - S - methallyl-β-aminoethanethiol, N-p-toluenesulfonyl-β-alanyl - S - crotyl-β-aminoethanethiol, N - carboalloxy-β-alanyl-S-benzyl-β-aminoethanethiol, N-carballoxy-β-alanyl-S-allyl-β-aminoethanethiol, N-carboalloxy-β-alanyl-S-methallyl-β-aminoethanethiol and N-carboalloxy-β-alanyl-S-crotyl-β-aminoethanethiol.

It is not necessary to further purify the N-substituted-β-alanyl-S-substituted-β-aminoethanethiol to carry out the next step in the reaction, but the product must be dried after removal of the solvent to avoid destruction of the metal by any water present. For example, if desired, purification of N-carbobenzoxy - β - alanyl-S-benzyl-β-aminoethanethiol may be accomplished by recrystallization from a mixture of methanol and isopropyl ether.

The N-substituted-β-alanyl-S-substituted-β-aminoethanethiol is reduced by dissolving N-substituted-β-alanyl-S-substituted-β-aminoethanethiol in liquid ammonia and stirring the reaction mixture while adding sodium metal until a blue color persists in the solution caused by the slight excess of sodium metal. Other alkali and alkaline earth metals, such as lithium, potassium, and calcium may be used. The reaction mixture is cooled in order to keep the ammonia from evaporating. This reaction mixture contains the sodium salt of β-alanyl-β-aminoethanethiol.

A suitable alkenyl or aralkyl halide such as benzyl halide, allyl halide, methallyl halide or crotyl halide is added to the aforementioned liquid ammonia solution in approximately equimolar ratio to the sodium salt of β-alanyl-β-aminoethanethiol. The solution is evaporated to dryness. The resulting solid product, β-alanyl-S-substituted-β-aminoethanethiol wherein the substituted radical is an alkenyl or aralkyl radical such as benzyl, allyl, methallyl or crotyl, may be purified by conventional extraction procedures, or by conversion to an acid salt of β-alanyl-S-substituted-β-aminoethanethiol and regeneration of the amine. However, if desired, the crude β-alanyl-S-substituted-β-aminoethanethiol may be conveniently used in the following step without further purification.

β-Alanyl-S-substituted-β-aminoethanethiol wherein the substituted radical is an alkenyl or aralkyl radical such as benzyl, allyl, methallyl or crotyl, may be converted to α,γ - dihydroxy - β,β - dimethylbutyryl-β-alanyl-S-substituted-β-aminoethanethiol by mixing equimolar portions of α-hydroxy-β,β-dimethyl-γ-butyrolactone and β-alanyl-S-substituted-β-aminoethanethiol in any order and heating the mixture with or without a solvent. I carried out this reaction employing methanol at reflux temperature. Other inert organic solvents may be used, such as aromatic or aliphatic hydrocarbons, halogenated hydrocarbons, ethers and alcohols, examples of which are, respectively, benzene, the octanes, chloroform, di-n-butyl ether and isopropanol. Upon completion of the reaction, the solvent is removed by distillation under reduced pressure, leaving α,γ-dihydroxy-β,β-dimethylbutyryl-β-alanyl-S-substituted-β-aminoethanethiol as a residual oil.

α,γ - Dihydroxy - β,β - dimethylbutryl - β - alanyl - S-substituted-β-aminoethanethiol wherein the substituted radical is an alkenyl or aralkyl radical such as benzyl, allyl, methallyl or crotyl, is reduced to α,γ-dihydroxy-β,β-dimethylbutyryl-β-alanyl-β-aminoethanethiol by dissolving α,γ - dihydroxy - β,β - dimethylbutyryl - β - alanyl - S-substituted-β-aminoethanethiol in liquid ammonia and stirring the solution while adding an alkali metal to the reaction mixture. When the preferred reactant, sodium metal, is used, the addition is continued until a blue color persists in the solution. Any unreacted sodium remaining may be converted to a salt by addition of an equivalent amount of an acid salt such as ammonium sulfate. The crude α,γ - dihydroxy - β,β - dimethylbutyryl - β - alanyl-β-aminoethanethiol is recovered by allowing the ammonia solution to evaporate to dryness. The α,γ-dihydroxy-β,β-dimethylbutyryl-β-alanyl-β-aminoethanethiol may then be purified by extraction into appropriate solvents and/or countercurrent distribution techniques.

The following examples illustrate methods of carrying out the present invention, but it is to be understood that these examples are given primarily by way of illustration and not of limitation.

EXAMPLE 1

*Preparation of N-carbobenzoxy-β-alanyl-S-benzyl-β-aminoethanethiol*

A suspension of 22.3 g. (0.1 mole) of N-carbobenzoxy-β-alanine in 400 ml. of dry ether was stirred and cooled to below 0° C. To the cold mixture was added 22.0 g. (0.1 mole) of phosphorous pentachloride and the mixture stirred an additional 45 minutes. The cold solution was filtered and then concentrated under reduced pressure at a temperature below 10° C. The residue, N-carbobenzoxy-β-alanyl chloride, dissolved in 60 ml. of dry ether, was added to a mixture of 16.7 g. (0.1 mole) of S-benzyl-β-aminoethanethiol, 40 ml. of 2.5 N sodium hydroxide solution, 60 ml. of water, and 200 ml. of ether at a temperature of less than 10° C. over a 15 minute period. A solid separated almost immediately. After the addition had been completed, an additional 25 ml. of 2.5 N sodium hydroxide solution was added. The stirring was continued an additional 15 minutes, after which time the solid was removed by filtration and washed with two 100 ml. portions of water. The dried product, N-carbobenzoxy-β-alanyl-S-benzyl-β-aminoethanethiol; melting point 118–120° C. was crystallized from a mixture consisting of 100 ml. of methanol and 200 ml. of isopropyl ether.

*Analysis.*—Calculated for $C_{20}H_{24}O_3N_2S$: C, 64.49; H, 6.49; N, 7.52. Found: C, 64.96; H, 6.20; N, 7.54.

In like manner, N-(p-nitrocarbobenzoxy)-β-alanine, N-p-toluenesulfonyl-β-alanine or N-carboalloxy-β-alanine may be substituted for N-carbobenzoxy-β-alanine in the above procedure. Also, S-allyl-β-aminoethanethiol, S-methallyl-β-aminoethanethiol or S-crotyl-β-aminoethanethiol may be substituted for S-benzyl-β-aminoethanethiol in the above procedure. The N-substituted-β-alanyl-S-substituted-β-aminoethanethiol thus produced include N-carbobenzoxy - β - alanyl - S-benzyl-β-aminoethanethiol, N-carbobenzoxy - β - alanyl - S - allyl-β-aminoethanethiol, N - carbobenzoxy - β - alanyl - S - methallyl - β - aminoethanethiol, N-carbobenzoxy-β-alanyl-S-crotyl-β - aminoethanethiol, N - (p - nitrocarbobenzoxy) - β - alanyl - S-benzyl - β - aminoethanethiol, N - (p - nitrocarbobenzoxy)-β - alanyl - S - allyl - β - aminoethanethiol, N - (p - nitrocarbobenzoxy - β - alanyl - S - methallyl - β - amino- ethanethiol, N - (p - nitrocarbobenzoxy) - β - alanyl - S-crotyl - β - aminoethanethiol, N - p - toluene - sulfonyl -β-alanyl - S - benzyl - β - aminoethanethiol, N - p - toluenesulfonyl - β - alanyl - S - allyl - β - aminoethanethiol, N- p - toluenesulfonyl - β - alanyl - S - methallyl - β - aminoethanethiol, N - p - toluene - sulfonyl - β - alanyl - S-crotyl - β - aminoethanethiol, N - carboalloxy - β - alanyl-S - benzyl - β - aminoethanethiol, N - carboalloxy - β-alanyl - S- allyl - β - aminoethanethiol, N - carboalloxy-β - alanyl - S - methallyl - β - aminoethanethiol, N - carboalloxy - β - alanyl - S - crotyl - β - aminoethanethiol.

*Preparation of the sodium salt of β-alanyl-β-aminoethanethiol*

About 600 ml. of liquid anhydrous ammonia was added to 28.2 g. (0.075 mole) of N-carbobenzoxy-β-alanyl-S-benzyl-β-aminoethanethiol. Metallic sodium was added to the stirred mixture until a permanent blue was obtained; 7.4 g. was required. The mixture contained the sodium salt of β-alanyl-β-aminoethanethiol. In like manner, any of the N-substituted-β-alanyl-S-substituted-β-aminoethanethiols described above may be substituted for N-carbobenzoxy-β-alanyl-S-benzyl-β-aminoethanethiol.

*Preparation of β-alanyl-β-aminoethanethiol*

Upon treatment of the sodium salt of β-alanyl-β-aminoethanethiol with an aqueous solution of hydrochloric acid there is obtained β-alanyl-β-aminoethanethiol.

*Preparation of β-alanyl-S-benzyl-β-aminoethanethiol hydrochloride*

The reaction flask containing the sodium salt of β-alanyl-β-aminoethanethiol was cooled in Dry Ice-alcohol and 10.1 g. (0.0875 mole) of benzyl chloride was slowly added. The ammonia was allowed to evaporate at room temperature, and when the evaporation was nearly completed 21.2 g. (0.322 equivalents) of ammonium sulfate was added. After all of the ammonia had evaporated, the residue was kept under reduced pressure for 16 hours. Ice was added and then sufficient hydrochloric acid was added to adjust the pH of the solution to about pH 2. The solution was extracted with two 100 ml. portions of ether. The aqueous phase was made strongly alkaline with 30% sodium hydroxide solution and β-alanyl-S-benzyl-β-aminoethanethiol extracted into three 200 ml. portions of chloroform. The chloroform extracts were combined, washed with three 100 ml. portions of ice water and dried over anhydrous sodium sulfate. After removal of the drying agent, the solution was concentrated under reduced pressure to yield an oily residue of β-alanyl-S-benzyl-β-aminoethanethiol. The residual oil was dissolved in 100 ml. of methanol, cooled, and treated with excess dry hydrogen chloride, during which time a crystalline precipitate separated from solution. The crystalline product, β-alanyl-S-benzyl-β-aminoethanethiol hydrochloride, was more completely precipitated by the addition of 500 ml. of ether. The dried product had a melting point of 163-165° C. A sample recrystallized for analysis had a melting point of 165–167° C.

*Analysis.*—Calculated for $C_{12}H_{19}ON_2SCl$: N, 10.20; S, 11.67; Cl, 12.90. Found: N, 10.30; S, 11.96; Cl, 12.56.

Allyl halide, methallyl halide or crotyl halide may be substituted for the benzyl chloride in the above procedure to produce the corresponding β-alanyl-S-allyl-β-aminoethanethiol, β-alanyl-S-methallyl-β-aminoethanethiol or β-alanyl-S-crotyl-β-aminoethanethiol.

*Preparation of α,γ-dihydroxy-β,β-dimethylbutyryl-β-S-benzyl-β-aminoethanethiol*

A solution of 30 percent sodium hydroxide was added to a solution of 8.8 g. (0.032 mole) β-alanyl-S-benzyl-β-aminoethanethiol hydrochloride in 80 ml. of ice and water until the oily free amine separated. The oil was extracted into several 50 ml. portions of chloroform. The combined chloroform extracts were washed with two portions of water, dried over anhydrous sodium sulfate, filtered and concentrated under reduced pressure to yield an oily residue, β-alanyl-S-benzyl-β-aminoethanethiol. The residual oil was dissolved in 30 ml. of methanol and 4.2 g. (0.032 mole) of α-hydroxy-β,β-dimethyl-γ-butyrolactone was added. The solution was refluxed for one hour and the solvent then removed under reduced pressure. The viscous oil, α,γ - dihydroxy - β,β - dimethylbutyryl-β-alanyl-S-benzyl-β-aminoethanethiol, remaining was dissolved in about 200 ml. of chloroform and washed with 25 ml. of 0.5 N hydrochloric acid followed by three 25 ml. water washes. The chloroform solution was dried over anhydrous sodium sulfate, filtered and concentrated under reduced pressure. A portion was freed of solvent at very low pressure for analysis.

*Analysis.*—Calculated for $C_{18}H_{28}O_4N_2S$: N, 7.60. Found: N, 7.89. $[\alpha]_D^{24°} = +20°$ (C=1.7 in methanol).

In like manner, β-alanyl-S-allyl-β-amino-ethanethiol hydrohalide, β-alanyl-S-methallyl-β-aminoethanethiol hydrohalide, or β-alanyl-S-crotyl-β-aminoethanethiol hydrohalide may be substituted for β-alanyl-S-benzyl-β-aminoethanethiol hydrochloride.

*Preparation of pantetheine (α,γ-dihydroxy-β-dimethylbutyryl-β-alanyl-β-aminoethanethiol)*

To 5 g. (0.014 mole) of α,γ-dihydroxy-β,β-dimethylbutyryl-β-alanyl-S-benzyl-β-aminoethanethiol in a flask cooled in Dry Ice-alcohol was added 150 ml. of liquid anhydrous ammonia. The cooling bath was removed and 1.4 g. (0.061 gram atom) of metallic sodium was added in small portions with stirring. A permanent blue color was obtained. Ammonium sulfate (0.67 g.) was added and stirring continued while the ammonia evaporated. A solid residue was obtained. The solid was dissolved in ice and water. Ammonium sulfate was added to lower the pH to about 8 or 9 and the solution was then extracted with four 50 ml. portions of N-butanol. The N-butanol extracts were dried over anhydrous sodium sulfate, filtered and concentrated under reduced pressure to yield pantetheine (α,γ-dihydroxy-β,β-dimethylbutyryl-β-aminoethanethiol) as an oil.

α,γ - Dihydroxy - β,β - dimethylbutyryl - β - alanyl - S-allyl - β - aminoethanethiol, α,γ - dihydroxy - β,β - dimethylbutyryl - β - alanyl - S - methallyl - β - aminoethanethiol or α,γ-dihydroxy-β,β-dimethylbutyryl-β-alanyl-S-β-crotyl-β-aminoethanethiol may be substituted for α,γ - dihydroxy - β,β - dimethylbutyryl - β - alanyl-S-benzyl-β-aminoethanethiol.

Any departure from the above description which conforms to the present invention is intended to be included within the scope of the claims.

What is claimed is:

α,γ-Dihydroxy-β,β-dimethylbutyryl-β-alanyl-S-benzyl-β-aminoethanethiol.

References Cited in the file of this patent

UNITED STATES PATENTS 2,680,767     Snell et al. _____ June 8, 1954

OTHER REFERENCES

Wieland et al.: "Chem. Ber.," vol. 85 (1952), p. 1035–42.

Baddiley et al.: "J. Chem. Soc.," 1952 (London), p. 800–03.

Baddiley et al.: "Nature," vol. 171, Jan. 10, 1953, p. 76.

Brown et al.: "J. Am. Chem. Soc.," vol. 75, April 5, 1953, p. 1695 and 1700.

Walton et al.: "J. Am. Chem. Soc.," vol. 76 (1954), p. 1146–48.